United States Patent
Ogura

[19]

[11] Patent Number: 5,980,166
[45] Date of Patent: Nov. 9, 1999

[54] ROTARY TOOL WITH SHANK

[75] Inventor: Norio Ogura, Aichi-ken, Japan

[73] Assignee: Kanefusa Corporation, Aichi-ken, Japan

[21] Appl. No.: 09/051,150

[22] PCT Filed: Sep. 13, 1996

[86] PCT No.: PCT/JP96/02651

§ 371 Date: Apr. 2, 1998

§ 102(e) Date: Apr. 2, 1998

[87] PCT Pub. No.: WO97/12712

PCT Pub. Date: Apr. 10, 1997

[30] Foreign Application Priority Data

Oct. 5, 1995 [JP] Japan .................................. 7-258787

[51] Int. Cl.$^6$ .................................. B23B 51/02
[52] U.S. Cl. .................. 408/57; 408/144; 408/226; 408/227
[58] Field of Search .................. 408/144, 226, 408/227, 230, 57, 59, 231

[56] References Cited

U.S. PATENT DOCUMENTS

| | | | |
|---|---|---|---|
| 2,786,373 | 3/1957 | Patton | 408/59 |
| 2,898,786 | 8/1959 | Willingham | 408/59 |
| 3,040,605 | 6/1962 | Andreasson | 408/59 |
| 3,045,513 | 7/1962 | Andreasson | 408/59 |
| 3,085,453 | 4/1963 | Mossberg | 408/144 |

FOREIGN PATENT DOCUMENTS

| | | |
|---|---|---|
| 61-109612 | 7/1986 | Japan . |
| 62-78207 | 5/1987 | Japan . |
| 62-81509 | 5/1987 | Japan . |
| 62-92113 | 6/1987 | Japan . |
| 62-241606 | 10/1987 | Japan . |
| 63-4215 | 1/1988 | Japan . |
| 63-21007 | 2/1988 | Japan . |
| 63-20647 | 4/1988 | Japan . |
| 6320323 | 11/1994 | Japan . |
| 8155736 | 6/1996 | Japan . |

*Primary Examiner*—Daniel W. Howell
*Attorney, Agent, or Firm*—Lawrence G. Fridman

[57] ABSTRACT

A rotary tool with a shank comprises a tool body and a tip member Joined to the tool body. A narrow hole starts at an inlet port positioned at an end surface or an outer peripheral surface of the shank to run along the axis of rotation of the tool up to a tip end of said tool body and communicates at the boundary of the tip member and the tool body with an outlet port which opens to the terminal ends of ejection grooves.

13 Claims, 9 Drawing Sheets

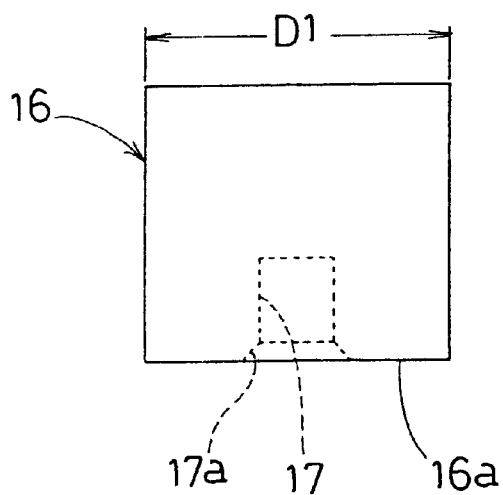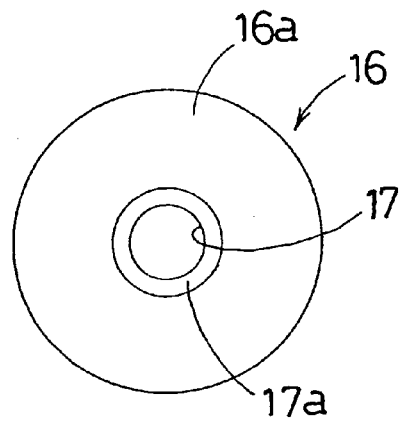
FIG.3(a)   FIG.3(b)
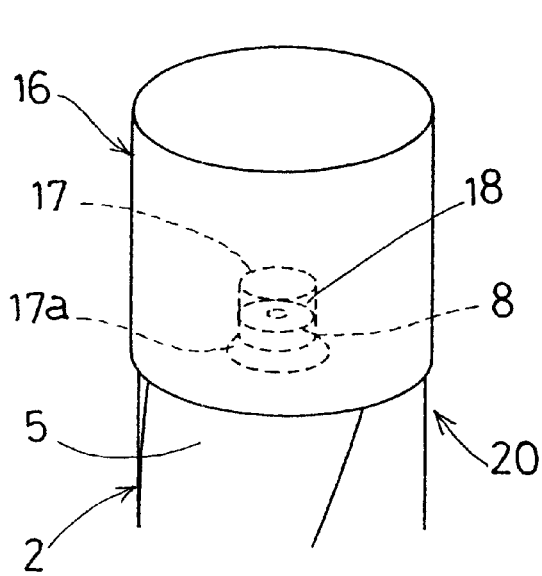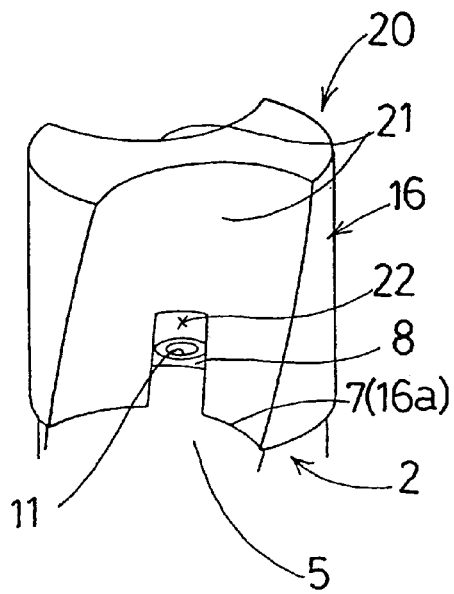
FIG.4(a)   FIG.4(b)

ROTARY TOOL WITH SHANK

TECHNICAL FIELD

The present invention relates to a rotary tool with a shank, such as a drill for drilling a hole in a workpiece made of wood, synthetic resin or metal, and an endmill for traverse feeding after a drilling operation, the rotary tool having a small-diameter hole (narrow hole) formed as a passage for air, oil or similar fluids for the purpose of lubrication, cooling, or chip ejection.

BACKGROUND OF THE INVENTION

Conventionally, as shown in FIG. 17, a rotary tool with a shank of this type has been available, for example, as a drill 60 having narrow holes 69. The drill 60 includes a shank 61 and a body 62. The body 62 has a neck 63, grooves 64 and a tip 65. The shank 61 has an inlet port 66 formed for introducing fluids at the end face thereof and extending a predetermined length along its rotational axis. Two narrow holes 69 are formed in communication with the inlet port 66 and extend through two lands 68 respectively at a corresponding helix angle thereof. The holes 69 lead to a flank 70 of the tip 65, so that fluids are supplied to the tip 65.

However, as for the tool material, hard materials such as cemented carbide are used, which makes it difficult to form helical holes 69 therein and thus makes such a tool expensive. In addition, in manufacturing drills with inverse or different helix angles, it is required to provide drill materials having the holes 69 formed at a helix angle corresponding to that of the respective drills. Further, it had not been found to be feasible to make only the tip 65, which is subject to wear, with a tip material of hard material and make the remaining body 62 and the shank 61 with low-cost steel, because it is difficult to join the tip material to the body 62 with the associated holes 69 aligned to each other and without the holes 69 becoming clogged with brazing material. Further, for a tool in which the fluids are supplied from the end face of the shank 61, it has been impossible to provide the tool with a length adjusting screw.

DISCLOSURE OF THE INVENTION

It is, accordingly, an object of the present invention to solve the noted problems of the prior art rotary tools, and specifically to provide an inexpensive rotary tool with a shank which has a narrow hole formed therein, wherein it is feasible to make the tip, which is subject to wear, with a tip material of a durable hard material, such as cemented carbide, and to make the remaining part other than the tip with general steel, such that the parts can be joined together without causing the hole to be closed, and wherein the same tool materials can be used for making tools having different helix angles.

A further object is to provide a rotary tool with a shank in which fluids are supplied from the end face of the shank and which provides for length adjustment.

Specifically, the present invention provides a rotary tool with a shank, of a type having a narrow hole for supplying fluids into the tool, which comprises a tool body and a tip member joined to the tool body, the narrow hole starting at an inlet port positioned at an end surface or an outer peripheral surface of the shank to run along the axis of rotation of the tool up to a tip end of the tool body and communicating at the boundary of the tip member and the tool body with an outlet port which opens to the terminal ends of ejection grooves.

As a result, during the process of brazing the tip member to the body of the rotary tool, the possibility that molten brazing material may flow into the hole and close the same can be remarkably reduced. Thus, it is possible to use a tip material only for the minimum part of the tip as necessary, while using low cost general steel for the remaining body portion. Further, in this invention, the outlet port is open, in communication with the hole, to the joining surface of the drill body with the tip member and to the terminal ends of connecting ejection grooves which are continuous with chip ejection grooves of the drill body. Thus, there is no need to form a hole in the flank of the tip as was necessary in the prior art, so that it is possible to obtain a drill which can be easily manufactured at a lower cost.

Further, the invention provides a rotary tool with a shank, of a type having a narrow hole for supplying fluids into the tool, which comprises a tool body and a tip member coaxially fitted and joined together by an insert portion comprised of a projection and an insert hole not communicating with ejection grooves, the narrow hole starting at an inlet port positioned at an end surface or an outer peripheral surface of the shank to run along the axis of rotation of the tool up to the center of the tool body insert hole and communicating, within the insert portion, with a tip hole which opens at a tip flank formed on the tip member.

As a result, efficiencies for cooling the tip and for ejecting chips remaining on the tip can be improved. Further, for metal cutting in which oil is used as the fluid, a tool having improved lubricity to the tip can be made at a lower cost.

Further, the invention provides the rotary tool as defined in claim 1 or 2, which further comprises a female screw formed in the inlet port of the narrow hole and a length adjusting male screw engaged with the female screw, the length adjusting male screw having a narrow hole formed axially therein.

As a result, even for a rotary tool having a length adjusting screw, fluids can be supplied from the end face of the shank to the drill without being interrupted by the screw.

BRIEF DESCRIPTION OF THE DRAWINGS

FIG. 2(*b*) is an enlarged perspective view of the tip end of the body.

FIG. 3(*a*) is a front view of a tip material to be brazed onto the tip end of the body.

FIG. 3(*b*) is an end view of the tip material to be brazed onto the tip end of the body.

FIG. 4(*a*) is a perspective view of an unfinished product obtained by brazing the tip material onto the tip end of the body of the rotary tool.

FIG. 4(*b*) is a perspective view of the tip material having ejection grooves formed therein so as to be continuous with the chip ejection grooves of the tool body.

BEST MODES OF CARRYING OUT THE INVENTION

Embodiment

Figure 1:
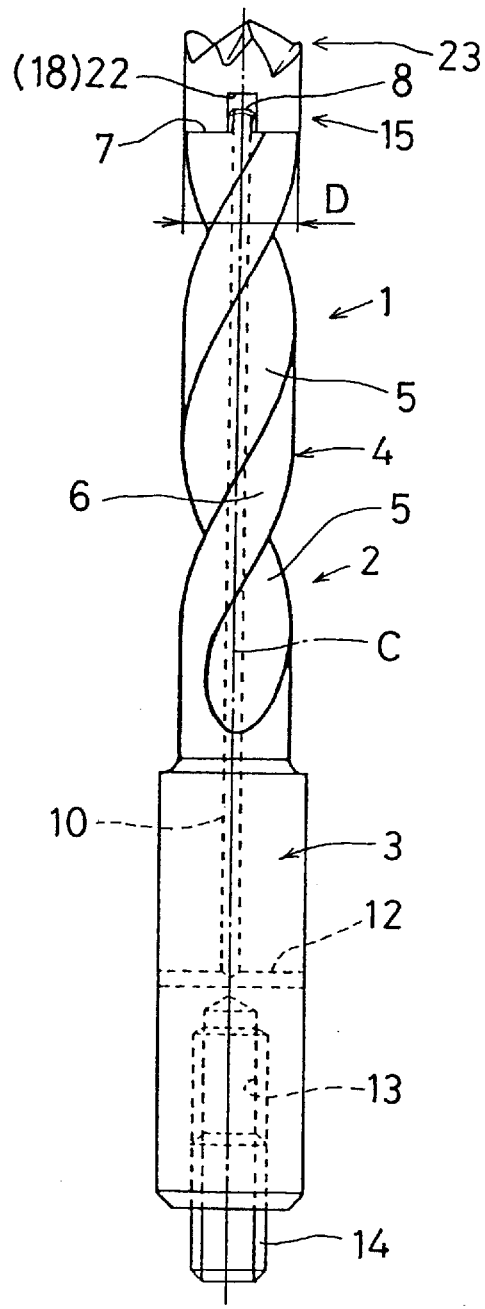
FIG. 1 is a front view of a rotary tool with a shank according to the present invention, the rotary tool having a hole for supplying fluids into the tool.
Figure 2A:
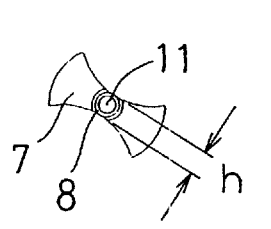
FIG. 2(*a*) is a plan view of a tip end of a body of the rotary tool.
Figure 2B:
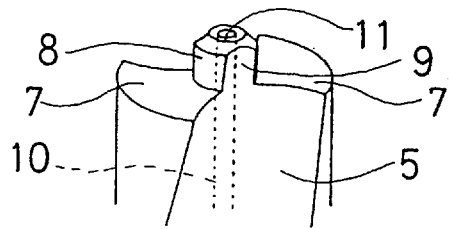

An embodiment of the present invention will now be explained with reference to the drawings. A rotary tool 1 of this embodiment is shown as a drill. As shown in FIGS. 1 and 2, the drill 1 has a drill body (or tool body) 2 and a tip member 15, and the drill body 2 includes a shank 3 and a body 4 made of general steel. As with a conventional drill, the body 4 has two chip ejection grooves (or flutes) 5 extending from the shank 3 to the tip of the body 4 at a predetermined helix angle, thereby defining two lands 6 therebetween. Further, the body 4 has a planar joint surface 7 defined on the tip end perpendicular to the axis of rotation C and adapted to join with the tip member 15. In the center of the surface 7, a cylindrical projection 8 is formed about the rotational axis C and has a diameter (about 0.3 mm) slightly larger than the core thickness h (distance between the terminal ends of the chip ejection grooves 5) and has a predetermined height. The projection 8 has an outer periphery formed with two arched surfaces 9 to be continuous with the respective chip ejection grooves 5 as an integral part thereof.

The drill body 2 has a narrow hole 10 extending along the rotational axis C and terminating at an opening 11 which is defined in the center of the tip end face of the projection 8. The hole 10 is in communication at its terminal end with an inlet hole 12, which is formed perpendicular thereto in a diametrical direction of the shank 3 and which is open at both ends to the outer periphery of the shank 3. The shank 3 has a female threaded portion 13 formed within its end and extending a predetermined length along the rotational axis C. A length adjusting screw 14 having a predetermined length is threadably engaged in the threaded portion 13. On the joint surface 7 of the drill body 2 thus formed, a tip material 16 for forming the tip member 15 is attached.

The tip material 16 is made of cemented carbide, and as shown in FIG. 3, the tip material 16 has a diameter D1 slightly larger than a diameter D of the drill body 2 and has a predetermined length. An end surface 16a of the tip material 16 is flat, so as to be attached to the joining surface 7, and has a central insert hole 17 having a predetermined length that is, for example, 1.5 to 2 times longer than the projection 8. The opening edge of the insert hole 17 is chamfered to form a chamfer 17a. The tip material 16 thus formed is brazed onto the joining surface 7 using a brazing filler metal with the projection 8 of the drill body 2 oriented upward.

The filler metal for brazing the tip material 16 may be a silver-alloy braze. Specifically, a silver-alloy brazing metal having a configuration generally conforming to the joining surface 7 is placed on the joining surface 7. The tip material 16 is then fitted over the projection 8, so that a space 18 is defined between the insert hole 17 and the projection 8 by the difference between their heights. In this state, the outer periphery of the portion to be joined is heated by high frequency induction, so that the silver-alloy brazing metal is melted and spread between the joining surface 7 and the surface 16a. The tip material 16 is thus joined to the drill body 2 to form an unfinished product 20 (see FIG. 4(a)).

Figure 5:
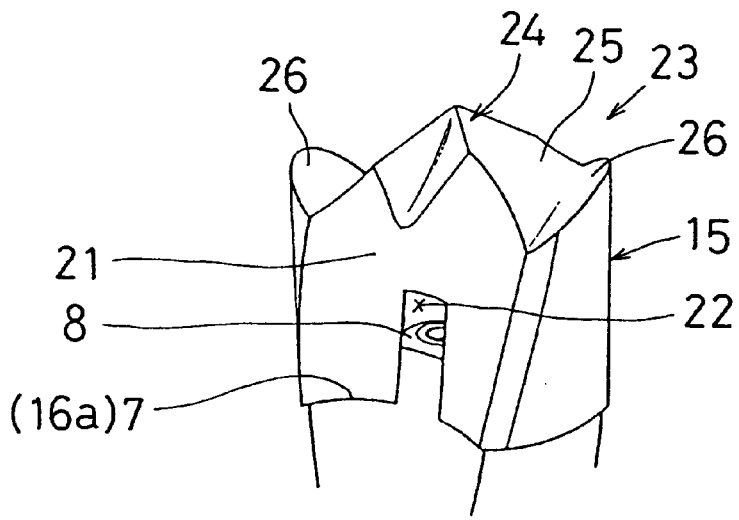
FIG. 5 is a perspective view of a tip member obtained by forming a tip on the tip material.

The unfinished product 20 thus formed is then machined using the following processes. As shown in FIGS. 4(b) and 5, two connecting ejection grooves 21 are cut in the tip material 16 such that they are continuous with the associated chip ejection grooves 5. Thus, the arched surface 9 of the cylindrical projection 8 forms an integral part of the ejection grooves 21, and the clearance 18 between the projection 8 and the insert hole 17 forms an outlet port 22 for fluids, which opens to the terminal ends of the connecting ejection grooves 21. On the tip end of the tip material 16, a tool tip 23 is formed, which is comprised of a central guide cutting edge 24 having a flank 25 and a spur 26. The drill 1 is thus produced.

The drill 1 of this embodiment comprises the drill body 2 and the tip member 15. The tip end of the drill body 2 has a joining surface 7 adapted to snugly engage with the tip member 15, and also has a cylindrical projection 8 which extends from the joining surface 7 on the rotational axis C, and which has a narrow hole 10 formed therethrough along the rotational axis C. On the other hand, the tip material 16 for the tip member 15 has a central insert hole 17 which is formed in the surface 16a to receive the projection 8 and which has the chamfer 17a on the opening edge. Brazing filler metal is interposed between the joining surface 7 and the surface 16a with the projection 8 oriented upward. In this state, the drill body 2 and the tip member 15 are brazed together by heating. With the projection 8 extending from the joining surface 7, the possibility that some of the molten brazing metal may flow into the hole 10 and close the same is remarkably decreased. Further, since the opening edge of the insert hole 17 of the tip material 16 to be fitted over the projection 8 is chamfered to provide the chamfer 17a, the molten brazing metal is trapped at the chamfer 17a, thus being prevented from flowing upward between the insert hole 17 and the projection 8. Therefore, the possibility that some of the molten brazing metal may flow into the hole 10 and close the same is further remarkably decreased. Further, since the cylindrical projection 8 is fitted into the insert hole 17 of the cylindrical tip material 16 so as to be brazed together, these two parts are readily positioned for brazing without the need for circumferential alignment.

Therefore, in contrast with the prior art in which the whole drill was manufactured with an expensive solid tip material because of difficulties in brazing the tip material, in this invention, it is possible to use the tip material only for the minimum part of the tip as necessary, while using low cost general steel for the remaining part of the drill body 2. Further, In this invention, the outlet port 22 is open, in communication with the hole 10, to the joining surface of the drill body 2 with the tip member 15 and to the terminal ends of the connecting ejection grooves 21 which are continuous with the chip ejection grooves 5 of the drill body 2. Thus, there is no need to form a hole in the flank of the tip as was necessary in the prior art, so that it is possible to produce the drill 1, which can be easily manufactured at a lower cost.

Figure 6:
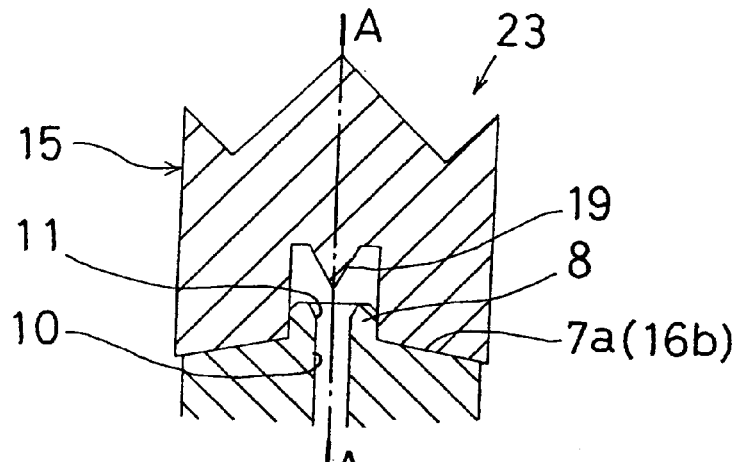
FIG. 6 is a sectional view showing a modification of the joining surface of the tip end of the body of the rotary tool and the insert hole.
Figure 7:
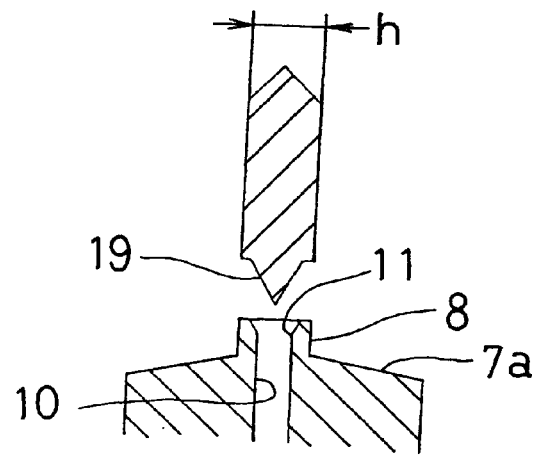
FIG. 7 is a sectional view taken along line A—A of FIG. 6.
Figure 8A:
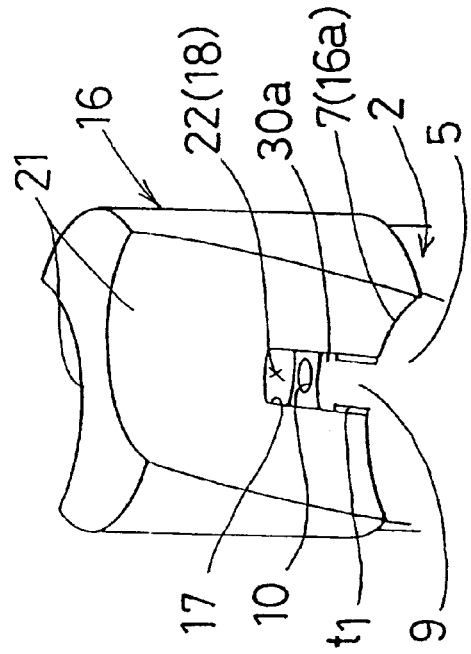
FIG. 8(a) is a perspective view showing a modification of the joining portion between the tip end of the body and the tip material.
Figure 8B:
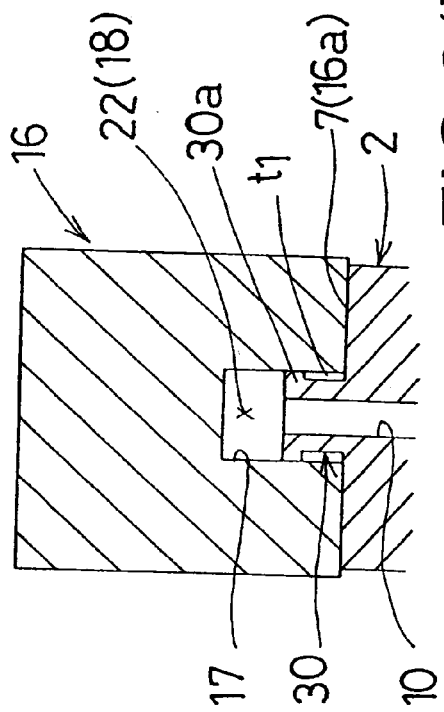
FIG. 8(b) is a sectional view of FIG. 8(a).

In the above embodiment, the central insert hole 17 formed in the tip material 16 is shown to have a flat end, but it is not a limitation. For example, as shown in FIGS. 6 and 7, the end may be configured to have a conical protrusion pointed toward the opening 11 of the hole 10 of the cylindrical projection 8. With this arrangement, fluids can be effectively guided toward the tip 23, so that efficiencies for chip ejection and cooling can be improved. Further, in the above embodiment, the joining surface 7 is formed perpendicular to the axis of rotation C, but it is not a limitation. For example, as shown in FIG. 6, the joining surface 7a may be formed with a conical convex surface which is inclined at a predetermined angle, while the surface 16a of the tip material 16 is formed with a conical concave surface for flush contact with the joining surface 7a. With this arrangement, the joining area is enlarged, so that greater joining strength can be obtained.

Further, the joint of the tip end of the drill body 2 with the tip material 16 may be constructed as shown in FIGS. 8 to 13. Specifically, in FIGS. 8(a) and 8(b), a central cylindrical projection 30 formed in the joining surface 7 of the drill body 2 is shown to have a flange 30a extending from its upper end and adapted to fit into the insert hole 17 of the tip material 16. When the tip material 16 is fitted on the projection 30 through the insert hole 17, a relatively large clearance t1 is defined below the flange 30a. With this construction, during heat brazing, the molten brazing metal is trapped in the clearance t1, thus preventing the hole 10 from being closed by the brazing metal.

Figure 9A:
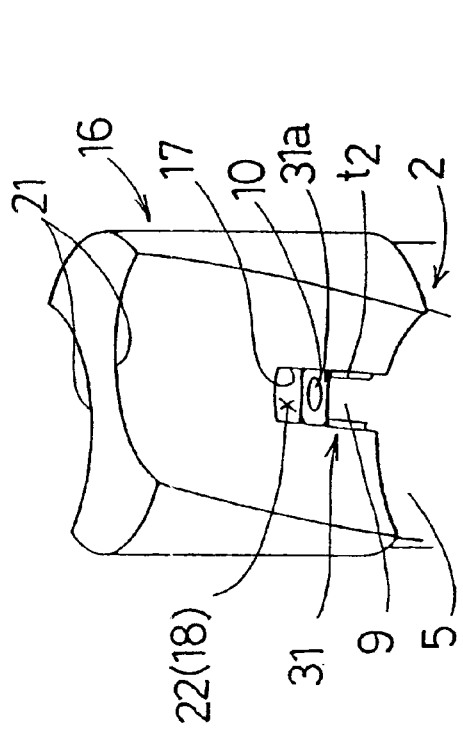
FIG. 9(a) is a perspective view showing another modification of the joining portion between the tip end of the body and the tip material.
Figure 9B:
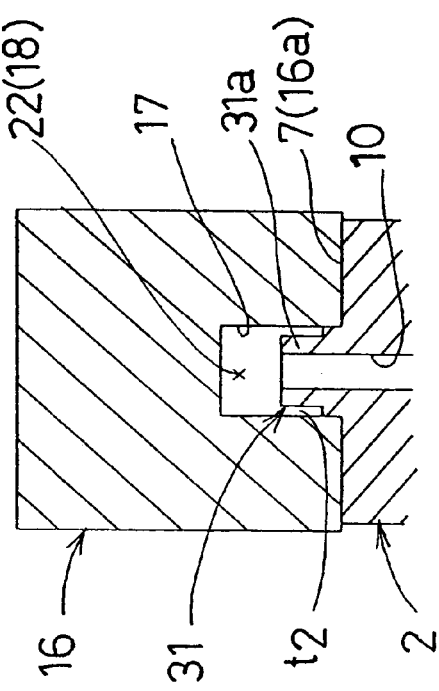
FIG. 9(b) is a sectional view of FIG. 9(a).

Further, in FIGS. 9(a) and 9(b), a central cylindrical projection 31 formed on the joining surface 7 of the drill body 2 is shown to have a small diameter portion 31a extending a predetermined distance from its upper end, thereby defining a clearance t2 between the projection 31 and the insert hole 17 of the tip material 16. With this construction, during heat brazing, the molten brazing metal is trapped in the clearance t2, thus preventing the hole 10 from being closed by the brazing metal.

Figure 10A:
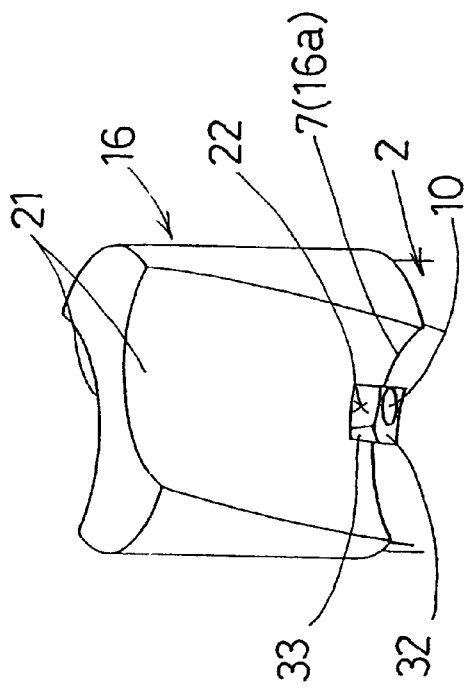
FIG. 10(a) is a perspective view showing still another modification of the joining portion between the tip end of the body and the tip material.
Figure 10B:
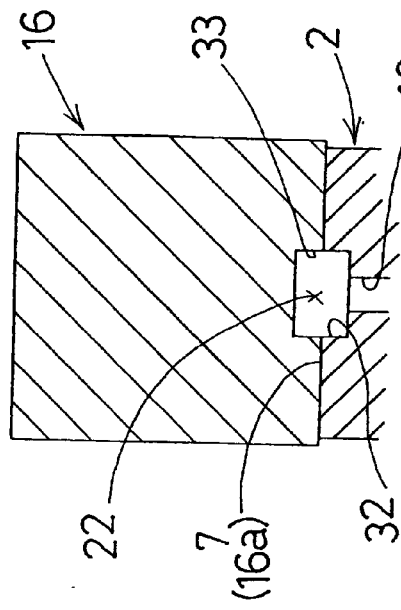
FIG. 10(b) is a sectional view of FIG. 10(a).

Further, in FIGS. 10(a) and 10(b), the joining surface 7 of the drill body 2 is shown to have a central recess 32 of a predetermined diameter, in place of the central cylindrical projection 8, with the hole 10 formed in its end. The surface 16a of the tip material 16 also has a central recess 33 formed in face-to-face conformity with the recess 32. With the tip material 16 placed beneath the drill body 2, they are heated to be brazed together. Thus, the molten brazing metal flows into the recess 33 of the tip material 16, without any possibility of flowing into the hole 10.

Figure 11A:
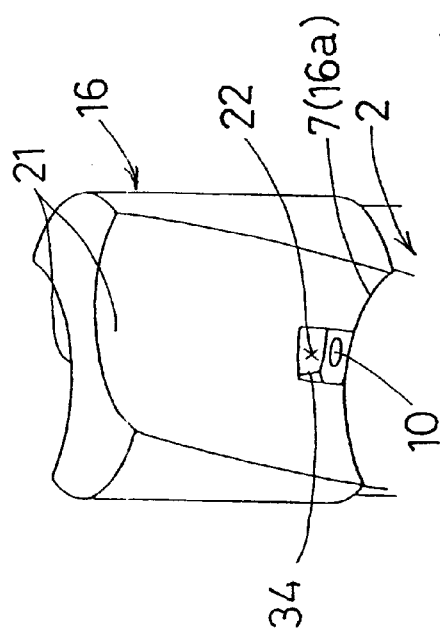
FIG. 11(a) is a perspective view showing a further modification of the joining portion between the tip end of the body and the tip material.
Figure 11B:
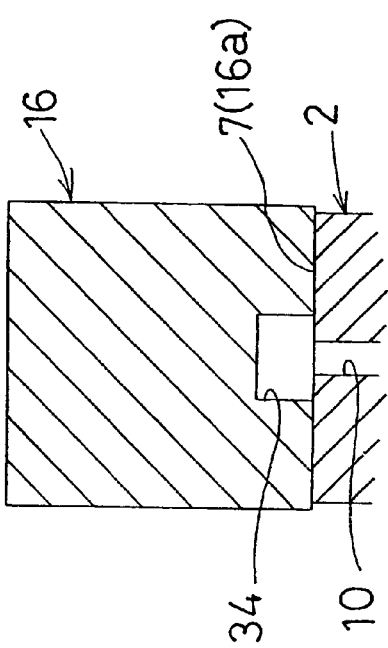
FIG. 11(b) is a sectional view of FIG. 11(a).

Further, in FIGS. 11(a) and 11(b), the joining surface 7 of the drill body 2 is shown to have the central narrow hole 10 defined in a fashion similar to conventional practice, while the surface 16a of the tip material 16 has a central recess 34 of a predetermined diameter. Similar to the above-mentioned modification, the tip material 16 and the drill body 2 are heated with the former placed beneath the latter to be brazed together. Thus, the molten brazing metal flows into the recess 33 of the tip material 16, without any possibility of flowing into the hole 10.

Figure 12A:
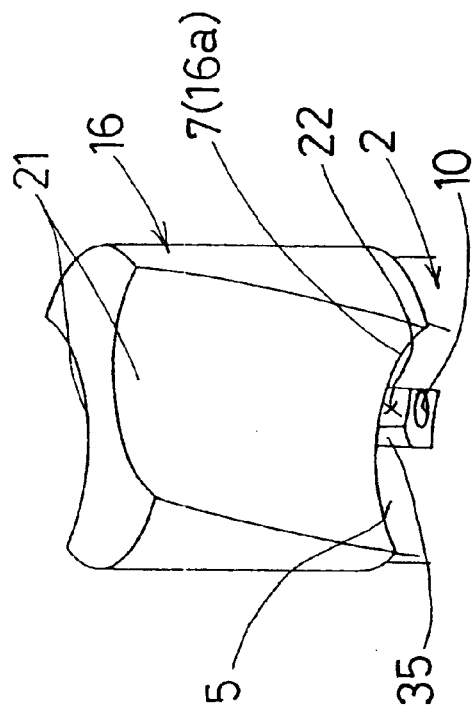
FIG. 12(a) is a perspective view showing a still further modification of the joining portion between the tip end of the body and the tip material.
Figure 12B:
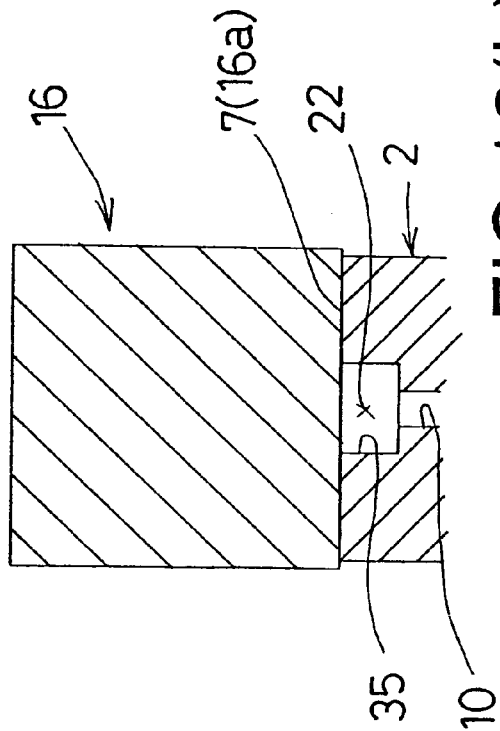
FIG. 12(b) is a sectional view of FIG. 12(a).

Further, in FIGS. 12(a) and 12(b), the joining surface 7 of the drill body 2 is shown to have a central recess 35 of a predetermined diameter, while the surface 16a of the tip material 16 is flat. The recess 35 is formed in advance having a diameter large enough to be opened to the terminal ends of the chip ejection grooves 5 to form the outlet port 22, and the hole 10 is formed in the bottom of the recess 35. Like the above-mentioned modification, the tip material 16 and the drill body 2 are heated with the former placed beneath the latter to be brazed together. Thus, the molten brazing metal flows out to the chip ejection grooves 5 through the outlet port 22, without any possibility of flowing into the hole 10.

Figure 13A:
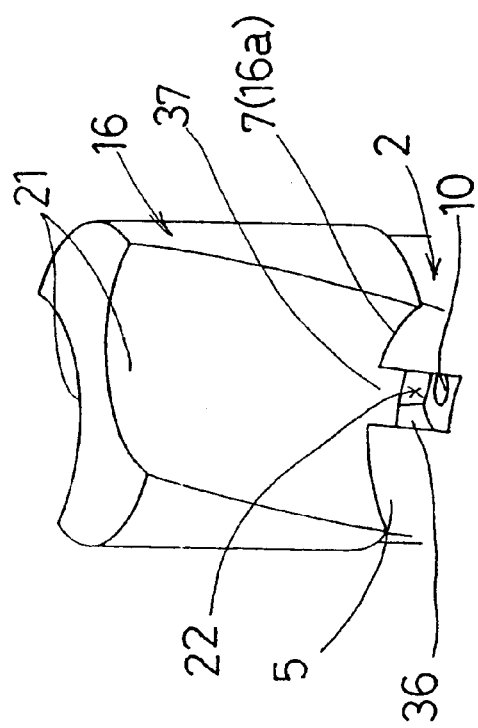
FIG. 13(a) is a perspective view showing another modification of the joining portion between the tip end of the body and the tip material.
Figure 13B:
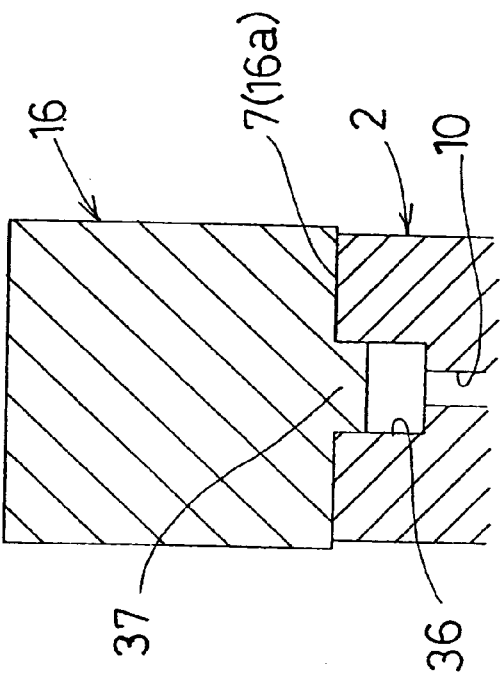
FIG. 13(b) is a sectional view of FIG. 13(a).

Further, in FIGS. 13(a) and 13(b), the joining surface 7 of the drill body 2 is shown to have a central recess 36 of a predetermined diameter having the hole 10 formed in the end thereof. The recess 36 is cut in the chip ejection grooves 5 and has a slightly greater depth. The surface 16a of the tip material 16 has a central projection 37 of a predetermined length which can be fitted into the recess 36. To braze the tip material 16 to the drill body 2, the projection 37 of the tip material 16 is fitted into the recess 36, and the tip material 16 and the drill body 2 are heated with the former placed beneath the latter. Therefore, if the molten brazing metal is forced out into the space defined between the projection 37 and the recess 36, there is no possibility of flowing into the hole 10. In the unfinished product 20 formed by thus mounting the tip material 16 on the body, the connecting ejection groove 21 is formed in a similar manner as mentioned before, thereby defining the outlet port 22 as desired with the recess 36 partly occupied by the projection 37.

Figure 14A:
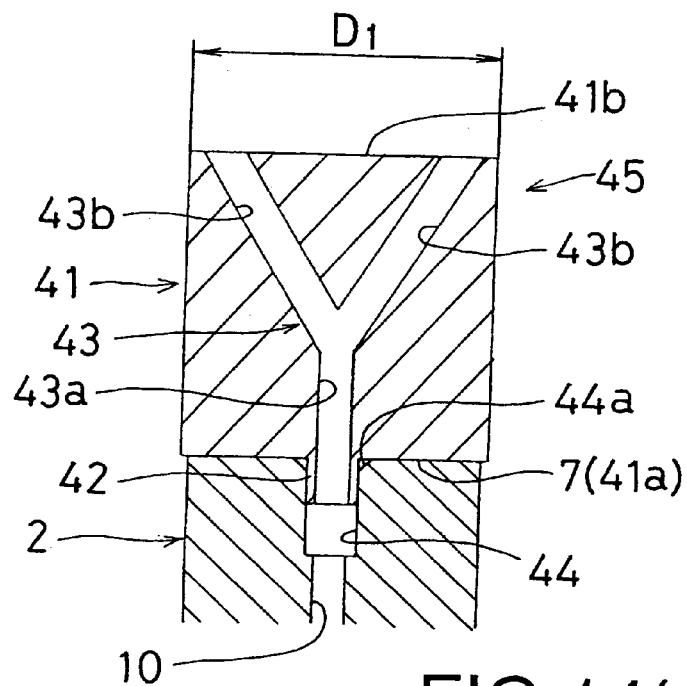
FIG. 14(a) is a sectional view showing a joining portion between the body of the rotary tool and a tip material which is designed to have a tip hole opening at the flank.
Figure 14B:
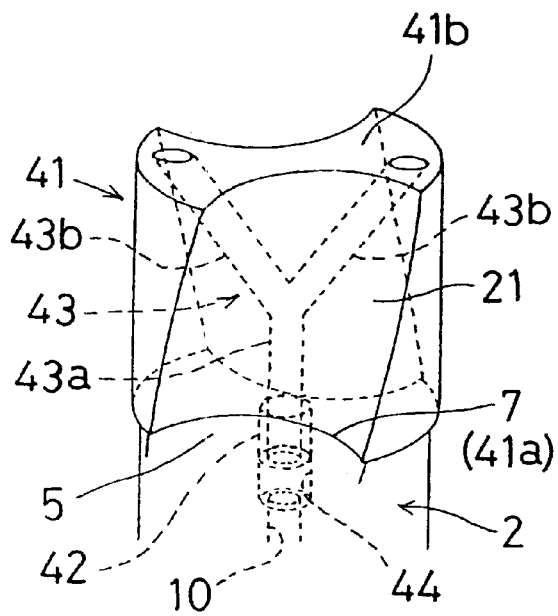
FIG. 14(b) is a perspective view of the tip material having connecting ejection grooves formed therein.
Figure 14C:
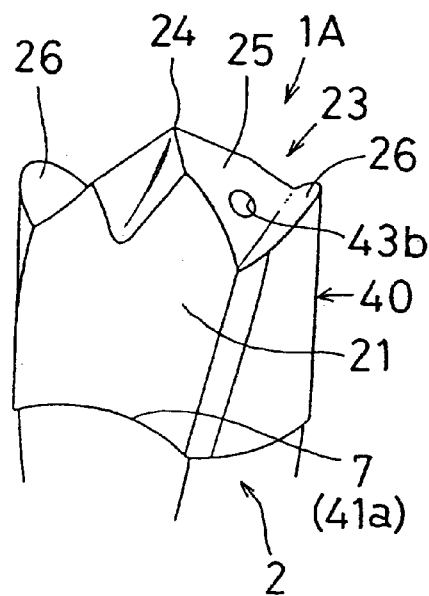
FIG. 14(c) is a perspective view of a tip member obtained by forming a tip on the tip material.

Next, FIGS. 14(a), 14(b) and 14(c) illustrate another embodiment of the invention. A tip member 40 is shown having a tip hole 43 for supplying fluids to the tool tip, the tip hole 43 extending therethrough in communication with the hole 10 of the drill body 2 and leading to the flank 25 of the tip 23 to be formed in the tip member 40. Like the tip material 16 described above, a tip material 41 for making the tip member 40 also has a diameter D1 slightly larger than the diameter D of the drill body 2. The tip hole 43 is formed during the tip material manufacturing process. The tip material 41 has one surface 41a to be brazed, which in turn has a central cylindrical projection 42 of a predetermined diameter formed therein. The tip hole 43 is substantially Y-shaped, defining a central hole 43a extending axially through the projection 42 to a predetermined depth and two holes 43b extending from the terminal end of the central hole 43a to be directed onto a predetermined radial position in the other surface 41b of the tip material 41. The joining surface 7 of the drill body 2 has a central insert hole 44 which is formed concentrically with the hole 10 for receiving the projection 42 and which has an opening peripheral edge chamfered to form a chamfer 44a. Unlike the insert hole 17 described above, the insert hole 44 has a diameter small enough not to be open to the terminal ends of the chip ejection grooves 5. The holes 43b may be circumferentially spaced at 120 degree intervals as necessary, for example, if three lands are provided.

To braze the tip material 41 thus constructed, similar to the modifications described above, the silver-alloy brazing metal is placed on the joining surface 7, and the projection 42 of the tip material 41 is fitted into the insert hole 44, and in this state, heat is applied with the tip material 41 placed underneath. Thus, the molten silver-alloy brazing metal is spread between the joining surface 7 and the surface 41a to braze them together. In this case, some of the molten brazing metal spread between the projection 42 and the insert hole 44 tends to flow upwardly, but practically, it is trapped in the chamfer 44a formed by chamfering the opening edge, thus being precluded from closing the hole 10 and the central hole 43. Further, the interlocking engagement of the parts ensures their accurate alignment, so that the brazing operation can be facilitated. By thus joining the tip material 41 to the drill body 2, an unfinished product 45 is obtained.

As shown in FIGS. 14(b) and 14(c), with the unfinished product 45 thus constructed, in its manufacturing process in a similar fashion as described, the connecting ejection grooves 21 are formed in the tip material 41 such that they are continuous with the chip ejection grooves 5 of the body 4. Then, on the tip end of the tip material 41, the tool tip 23 is formed which is comprised of the central guide cutting edge 24, which has the flank 25 and the spur 26, so that the forked hole 43b is opened in the flank 25. A drill 1A is thus produced.

With the drill 1A thus constructed, since the tip hole 43 has the forked hole 43b which opens to the flank 25 of the tool tip 23 and which communicates with the hole 10, it is possible to obtain an operational efficiency generally equivalent to that of the above-mentioned embodiment. In addition, by providing the tip hole 43 leading to the flank 25, it is possible to improve efficiencies for cooling the tip 23 and for ejecting chips remaining on the tip 23. Further, for metal cutting in which oil is used as the fluid, it is possible to improve lubricity to the tip 23.

Figure 15B:
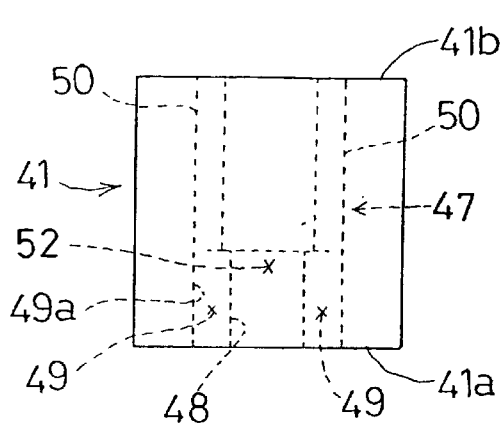
FIG. 15(b) is a side view of the tip material shown in FIG. 15(a).
Figure 15B:
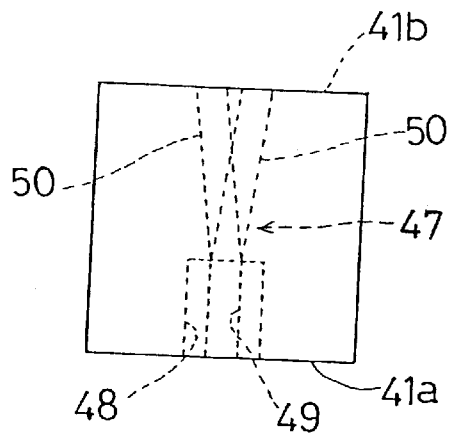
Figure 15A:
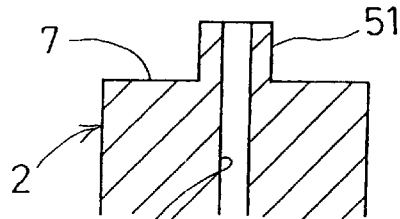
FIG. 15(a) is a front view showing a modification of the tip material of the rotary tool and the body, with the tip end of the body shown in cross section.
Figure 15C:
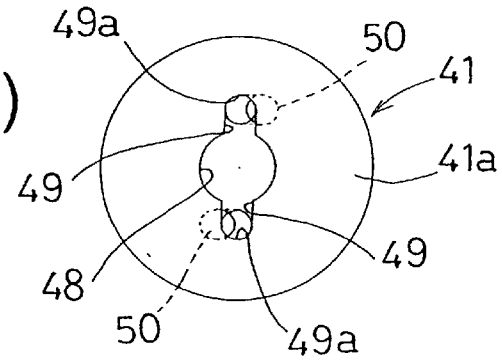
FIG. 15(c) is a bottom view of the tip material of FIG. 15(b).

Further, in FIGS. 15(a), 15(b) and 15(c), a modification of the tip material 41 is shown to have a tip hole 47 leading to the tip 23. The tip hole 47 includes a central hole 48 formed in the surface 41a of the tip material 41 and extending to a predetermined depth therefrom. The central hole 48 has grooves 49 each having a round terminal end 49a which extends outwardly therefrom, for example, at a diametrically opposed position. The center of a circle of the round end 49a is located on a concentric circle having a diameter one half of the diameter D1 of the tip material 41. Further, a forked hole 50 extends from the round depth end 49a such that it is oriented at a predetermined angle of inclination toward the other surface 41b of the tip material 41 as shown in FIG. 15(b), to be led onto the concentric circle having a diameter one half of the diameter D1 of the tip material 41 (onto the flank 25 which will be formed), for example, in a diametrically opposed position. The tip hole 47 is thus defined. On the other hand, a cylindrical projection 51 is centrally formed in the joining surface 7 of the drill body 2 to be snugly received in the central hole 48 and has an opening of the hole 10 extending therethrough. The projection 51 thus constructed Is fitted in the central hole 48 of the tip material 41 to be brazed together. In this case, the grooves 49 are closed by the joining surface 7 which is brought into abutment against the surface 41a, thus defining a space 52 above and on the groove side of the projection 51. The brazing material which has been heated and melted in this state is spread between the joining surface 7 and the surface 41a to be brazed together, and some of the molten metal pushed into the grooves 49 remains and solidifies therein without closing the hole 10. The hole 10 communicates with the forked hole 50 through the space 52. In this case, grinding the tip 23 again after forming the tip 23 will not cause a slight shift of the opening position of the hole 10.

Figure 16:
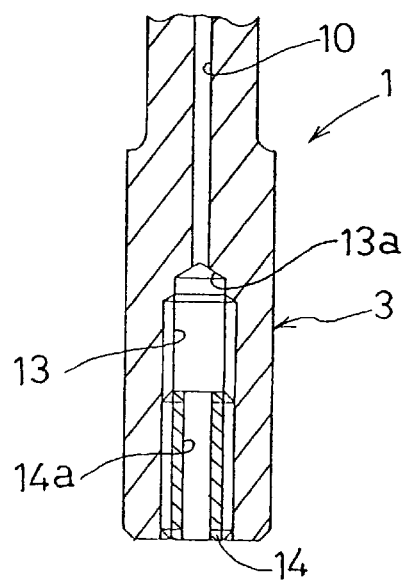
FIG. 16 is a sectional view of a shank of a rotary tool.
Figure 17:
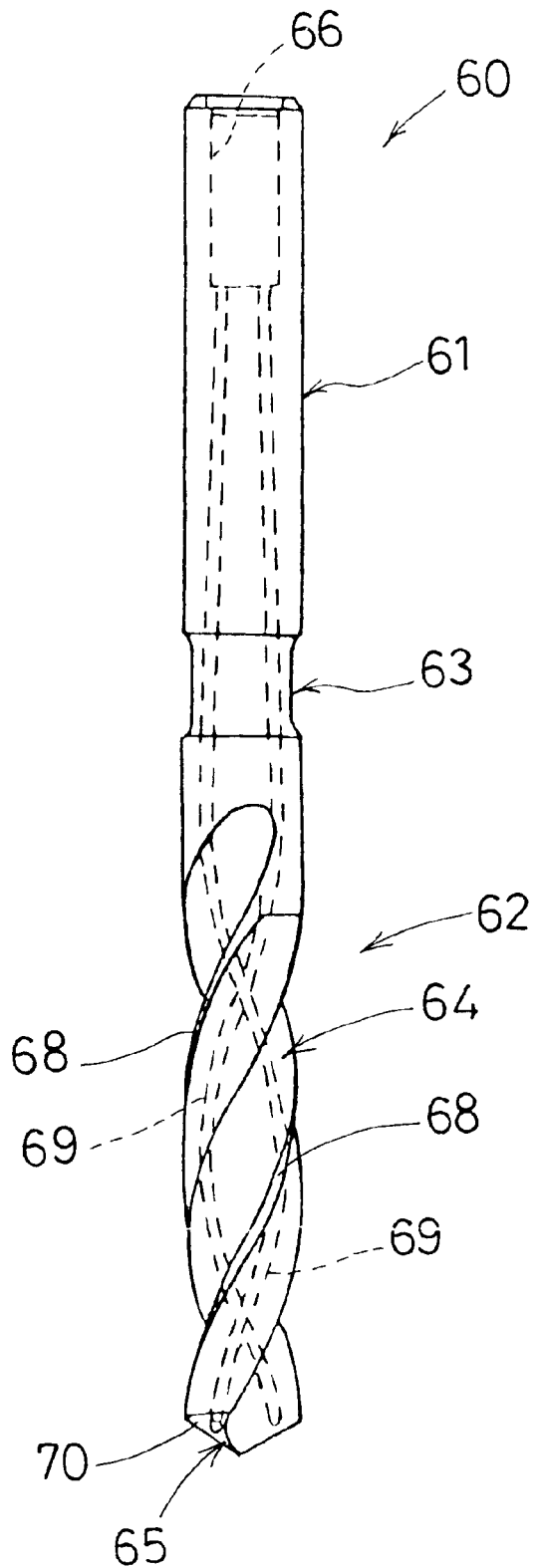
FIG. 17 is a front view of a prior art drill.

The structure for joining the tip material has been explained so far. The female threaded portion 13 is formed within the end of the shank 3 of the drill 1 and the length adjusting screw 14 is threadably engaged in the threaded portion 13. If the tip 23 is worn down by grinding or a similar operation, the length of the drill 1 can be adjusted by the adjusting screw 14. As shown in FIG. 16, the drill 1 may be constructed such that the hole 10 is formed in communication with a bottom portion 13a of the female threaded portion 13 and the length adjusting screw 14 has an air hole 14a centrally formed therethrough. With this construction, even in the drill 1 having the length adjusting screw, fluids can be supplied from the end face of the shank 3 without being interrupted by the screw. In addition, there is no need for providing an inlet hole 12 which is open at the outer periphery of the shank 3.

Although, in the above embodiments, the chip erection grooves 5 are formed at a certain helix angle, they may have a smaller or no helix angle since the supply of fluids improves efficiency for ejecting the chips. Further, in the embodiments, cemented carbide is used as a material for the tip material and a brazing method is adopted as a joining method, but these are not limitations. The configuration of the tip portion is not also limited to that of the embodiments.

In the present invention thus constructed, when the tip member is brazed to the body of the rotary tool, the possibility that the molten brazing material may flow into the hole and close the same can be remarkably reduced. In addition, since the chamfer is provided either on the cylindrical projection or the recess which is centrally formed either in the tip end of the body or the tip member, the molten brazing material is trapped at the chamfer. Thus, the possibility that the molten brazing metal may flow into the hole 10 and close the same is further remarkably decreased. Further, since the cylindrical projection is fitted into the cylindrical insert hole of the tip material to be brazed together, the two parts are readily positioned for brazing together without need for circumferential alignment. Therefore, in contrast with the conventional practice, where the whole rotary tool was made of an expensive solid material for the tip member because of difficulties in brazing the tip material, in the present invention, it is possible to use the tip material only for the minimum part of the tip as necessary, while using low cost general steel for the remaining body portion. Further, in this invention, the outlet port is open, in communication with the hole, to the joining surface of the drill body with the tip member and to the terminal ends of the connecting ejection grooves which are continuous with the chip ejection grooves of the drill body. Thus, there is no need to form a hole in the flank of the tip as was necessary in the prior art, so that it is possible to produce the drill, which can be easily manufactured at a lower cost.

Further, in the manufacturing process of the tip material, since the tip hole may be formed having a forked hole which opens to the flank, it is possible to improve efficiencies for cooling the tip and for ejecting chips remaining on the tip. Further, for metal cutting in which oil is used as the fluid, it is possible to improve lubricity to the tool tip.

Further, the rotary tool may be constructed such that the hole is formed in communication with the bottom portion of the female threaded portion of the shank and the length adjusting screw has the air hole centrally formed therethrough. With this construction, even in the rotary tool having the length adjusting screw, the fluids can be supplied from the end face of the shank to the drill without being interrupted by the screw. In addition, there is no need to provide an inlet hole which is open at the outer periphery of the shank, so that the construction of the holding portion of the shank can be simplified.

What is claimed is:

1. A rotary tool comprising:

a tool body having first and second ends and a narrow fluid passage disposed within the tool body;

a shank disposed at the first end of the tool body;

a tip member disposed at the second end of the tool body;

said tip member and tool body having chip ejection grooves; and said narrow fluid passage extending substantially along an axis of rotation of the rotary tool up to an interface of said tip member and said tool body, said narrow fluid passage communicating with outlet ports disposed within the chip ejection grooves at the interface between the tip member and the tool body.

2. The rotary tool of claim 1, further comprising a fluid inlet port formed at a rear end of said shank and communicating with said narrow fluid passage, a female connecting arrangement formed within said inlet port, and a length adjusting male arrangement engaging said female arrangement and having a narrow opening formed axially therein.

3. The rotary tool of claim 2, wherein said rotary tool is a drill, said female arrangement is a female screw, and said male arrangement is a male screw.

4. The rotary tool of claim 1, wherein said narrow fluid passage diametrically extends within said shank.

5. The rotary tool of claim 1, further comprising a substantially cylindrical projection formed at the end of said tip member that interfaces with the second end of the tool body and an insert port formed in the second end of the tool body, said substantially cylindrical projection is inserted into said insert port so that a clearance is defined between an outer periphery of said projection and an inner periphery of said insert port.

6. The rotary tool of claim 1, further comprising an insert port formed in the end of said tip member that interfaces with the second end of the tool body and a substantially cylindrical projection formed at the second end of the tool body, said substantially cylindrical projection is inserted into said insert port so that a clearance is defined between an outer periphery of said projection and an inner periphery of said insert port.

7. A rotary tool comprising:

a tool body having first and second ends and a narrow fluid passage disposed within the tool body;

a shank disposed at the first end of the tool body;

a tip member disposed at the second end of the tool body;

said tip member having a substantially cylindrical projection formed at an end thereof facing said tool body, and a fluid path disposed within said tip member for communication of fluids between an outer periphery of said projection and a tip flank of said tip member; and said tool body having an insert port in the second end thereof, said insert port being adapted to receive said substantially cylindrical projection, chip ejection grooves disposed along an outer periphery of the tool body, said narrow fluid passage extending substantially along an axis of rotation of the rotary tool up to said insert port;

a female connecting arrangement formed within an inlet port of said narrow fluid passage, and a length adjusting male arrangement engaging said female arrangement and having a narrow opening formed axially therein;

wherein a clearance is defined between an outer periphery of said projection and an inner periphery of said insert port.

8. The rotary tool of claim 7, wherein said rotary tool is a drill, said female arrangement is a female screw, and said male arraignment is a male screw.

9. The rotary tool of claim 7, wherein said narrow fluid passage diametrically extends within said shank.

10. A rotary tool comprising:

a tool body having first and second ends and a narrow fluid passage disposed within the tool body;

a shank disposed at the first end of the tool body;

a tip member disposed at the second end of the tool body;

said tip member having an insert port within an end thereof facing the tool body, said insert port including grooves for receiving brazen material when the tip member and the tool body are attached, a fluid path disposed within said tip member for communication of fluids between a bottom of said insert port and a tip flank of said tip member;

said tool body having a substantially cylindrical projection at the second end thereof, chip ejection grooves disposed at an outer periphery of the tool body; and said narrow fluid passage extending substantially along an axis of rotation of the rotary tool up to a top face of said substantially cylindrical projection, wherein a clearance is defined between an outer periphery of said projection and an inner periphery of said insert port.

11. The rotary tool of claim 10, further comprising a female connecting arrangement formed within an inlet port of said narrow fluid passage, and a length adjusting male arrangement engaging said female arrangement and having a narrow opening formed axially therein.

12. The rotary tool of claim 11, wherein said rotary tool is a drill, said female arrangement is a female screw, and said male arrangement is a male screw.

13. The rotary tool of claim 11, wherein said narrow fluid passage diametrically extends within said shank.

* * * * *